United States Patent
Bomber et al.

(10) Patent No.: US 6,325,983 B1
(45) Date of Patent: Dec. 4, 2001

(54) NOX SCRUBBING SYSTEM AND METHOD

(75) Inventors: Andrew J. Bomber, Vancouver, WA (US); Allen R. Boyce, Portland, OR (US); Debasish Mukhopadhyay, Palo Alto, CA (US)

(73) Assignee: SEH America, Inc., Vancouver, WA (US)

( * ) Notice: Subject to any disclaimer, the term of this patent is extended or adjusted under 35 U.S.C. 154(b) by 0 days.

(21) Appl. No.: 09/556,117

(22) Filed: Apr. 19, 2000

(51) Int. Cl.[7] .............................. B01D 53/54; B01D 53/78
(52) U.S. Cl. .................................. 423/235; 95/9; 95/187; 95/199; 95/224; 422/171
(58) Field of Search .......................... 96/244; 95/9, 187, 95/188, 189, 199, 223, 224; 422/171, 189; 423/235, 239.1, 393, 395

(56) References Cited

U.S. PATENT DOCUMENTS

| | | | |
|---|---|---|---|
| 3,721,621 | 3/1973 | Hough | 270/22 |
| 3,870,033 | 3/1975 | Faylor et al. | 126/360 R |
| 3,953,580 | 4/1976 | Allen et al. | 423/283 |
| 3,964,999 | 6/1976 | Chisdes | 270/23 R |
| 3,985,648 | 10/1976 | Casolo | 270/27 |
| 4,182,676 | 1/1980 | Casolo | 270/27 |
| 4,235,715 | 11/1980 | Wiegert | 270/670 |
| 4,235,845 | 11/1980 | Bose | 422/171 |
| 4,321,145 | 3/1982 | Carlson | 270/678 |
| 4,399,107 | 8/1983 | Bose | 422/170 |
| 4,425,313 | 1/1984 | Cooper | 423/235 |
| 4,430,226 | 2/1984 | Hegde et al. | 270/638 |
| 4,532,045 | 7/1985 | Littmann | 270/668 |
| 4,532,047 | 7/1985 | Dubin | 270/698 |
| 4,548,716 | 10/1985 | Boeve | 270/652 |
| 4,574,049 | 3/1986 | Pittner | 270/639 |
| 4,698,153 | 10/1987 | Matsuzaki et al. | 270/192 |
| 4,732,609 | 3/1988 | Frey et al. | 75/777 |
| 4,755,298 | 7/1988 | Grinstead | 270/638 |
| 4,820,421 | 4/1989 | Auerswald | 270/670 |
| 4,824,574 | 4/1989 | Cadotte et al. | 270/654 |
| 4,900,450 | 2/1990 | Schmidt | 270/679 |
| 4,917,806 | 4/1990 | Matsunaga et al. | 270/662 |

(List continued on next page.)

FOREIGN PATENT DOCUMENTS

| | | | |
|---|---|---|---|
| 17 92 304 | 8/1975 | (DE) | C02B/1/30 |
| 26 07 737 | 9/1976 | (DE) | B01D/13/00 |
| 196 03 494 | 8/1997 | (DE) | C02F/9/00 |
| 50-75987 | 6/1975 | (JP) | B01D/13/00 |
| 50-88017 | 7/1975 | (JP) | C07C/51/42 |
| 53-4777 | 1/1978 | (JP) | B01D/13/00 |
| 54-83688 | 7/1979 | (JP) | B01D/13/00 |
| 56-139106 | 10/1981 | (JP) | B01D/13/00 |
| 58-118538 | 7/1983 | (JP) | C07C/51/42 |
| 58-122084 | 7/1983 | (JP) | C02F/1/44 |
| 62-204892 | 9/1987 | (JP) | C02F/1/42 |
| 2-207888 | 8/1990 | (JP) | B01D/61/04 |
| 2-227185 | 9/1990 | (JP) | C02F/1/60 |

Primary Examiner—Steven P. Griffin
Assistant Examiner—Maribel Medina
(74) Attorney, Agent, or Firm—Alston & Bird LLP

(57) ABSTRACT

A treatment system for process exhaust streams containing NOx. The system includes a plurality of sequential scrubbing assemblies that collectively receive and contact a process exhaust stream containing NOx and a water stream to produce a product exhaust stream with a concentration of NOx that is below a determined threshold value. The removed NOx forms a portion of a system waste liquid stream that includes a majority of the NOx removed from the process exhaust stream.

33 Claims, 4 Drawing Sheets

U.S. PATENT DOCUMENTS

| | | | |
|---|---|---|---|
| 4,969,520 | 11/1990 | Jan et al. | 166/266 |
| 4,976,864 | 12/1990 | Baradel et al. | 270/670 |
| 4,995,983 | 2/1991 | Eadie et al. | 270/639 |
| 5,028,336 | 7/1991 | Bartels et al. | 270/639 |
| 5,061,374 | 10/1991 | Lewis | 270/638 |
| 5,064,625 | 11/1991 | Curtius | 423/235 |
| 5,073,268 | 12/1991 | Saito et al. | 270/638 |
| 5,082,483 | 1/1992 | Spencer et al. | 65/19 |
| 5,112,587 | 5/1992 | von Wedel et al. | 423/235 |
| 5,174,901 | 12/1992 | Smith | 270/652 |
| 5,236,722 | 8/1993 | Schroeder | 426/67 |
| 5,246,586 | 9/1993 | Ban et al. | 270/638 |
| 5,250,185 | 10/1993 | Tao et al. | 270/654 |
| 5,266,203 | 11/1993 | Mukhopadhyay et al. | 270/638 |
| 5,292,439 | 3/1994 | Morita et al. | 270/638 |
| 5,338,456 | 8/1994 | Stivers | 270/652 |
| 5,358,640 | 10/1994 | Zeiher et al. | 270/639 |
| 5,385,664 | 1/1995 | Oinuma et al. | 270/151 |
| 5,397,549 | 3/1995 | Newman | 423/235 |
| 5,414,100 | 5/1995 | Ayorinde et al. | 554/191 |
| 5,476,591 | 12/1995 | Green | 270/638 |
| 5,529,689 | 6/1996 | Korin | 270/232 |
| 5,571,419 | 11/1996 | Obata et al. | 270/664 |
| 5,573,666 | 11/1996 | Korin | 270/232 |
| 5,637,282 | 6/1997 | Osborne et al. | 423/235 |
| 5,670,053 | 9/1997 | Collentro et al. | 270/652 |
| 5,695,643 | 12/1997 | Brandt et al. | 270/652 |
| 5,714,055 | 2/1998 | Lewis et al. | 208/48 R |
| 5,766,479 | 6/1998 | Collentro et al. | 270/639 |
| 5,770,041 | 6/1998 | Lewis et al. | 208/48 AA |
| 5,925,255 | 7/1999 | Mukhopadhyay | 210/652 |

NOX SCRUBBING SYSTEM AND METHOD

FIELD OF THE INVENTION

The invention relates generally to treatment systems for removing nitrogen oxides from process exhaust streams, and more particularly to a gas scrubbing system and method for treating such streams.

BACKGROUND OF THE INVENTION

State and federal laws regulate the discharge of oxides of nitrogen, such as nitrogen monoxide and nitrogen dioxide (collectively referred to herein as NOx), to the atmosphere. Therefore, in processing facilities in which NOx is present in the process exhaust streams, these streams must be treated prior to release into the environment. An example of such a facility is a semiconductor processing facility, and especially a facility involved in the processing of silicon wafers. Some of these process exhaust streams result from the use of nitric acid, such as in etching and cleaning processes, however, the present invention is applicable to treating any process stream containing NOx, regardless of the original source of the NOx.

A variety of treatment mechanisms have been developed to remove NOx from process exhaust streams. For example, one known process is discussed in U.S. Pat. No. 5,637,282, the disclosure of which is hereby incorporated by reference. That system involves removing NOx from a process exhaust stream through scrubbing with an aqueous peroxide solution. While effective, this system requires the processing facility be equipped with suitable handling and storage equipment for hydrogen peroxide. It also requires a considerable flowrate of once-through water, which must be disposed of after use.

SUMMARY OF THE INVENTION

The present invention provides a system and method for cost-effective removal of NOx. The invented system includes a plurality of sequential scrubbing assemblies that receive a process exhaust stream containing a concentration of NOx and collectively reduce the concentration of NOx therein to below a determined threshold. The scrubbing assemblies each include a reverse osmosis assembly that significantly reduces water consumption for the scrubbing process as compared to conventional once-through systems. The system may be operated at an elevated pH to prevent fouling from inhibiting the cost-effective operation of the reverse osmosis assemblies. The system may also include an automated control system adapted to monitor and control the operation of the system.

DETAILED DESCRIPTION AND BEST MODE OF THE INVENTION

Figure 1:
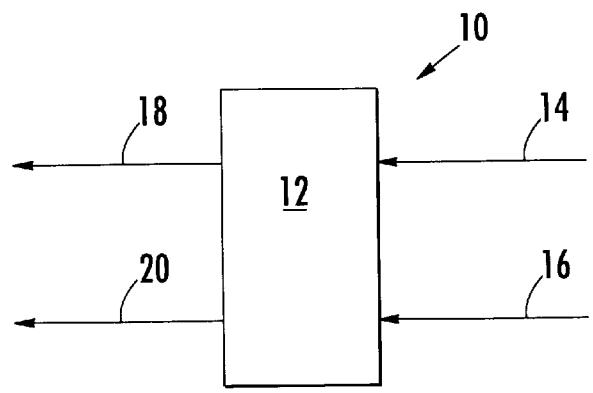
FIG. 1 is a schematic view of a NOx scrubbing system according to the present invention.

A NOx scrubbing system according to the present invention is shown in FIG. 1 and generally indicated at 10. System 10 includes a plurality of scrubbing assemblies 12 and is adapted to receive and contact a feed, or process exhaust, stream 14 containing a concentration of NOx and a water stream 16 to reduce the concentration of NOx in the process exhaust stream. An example of a common feed stream is a NOx-laden exhaust stream from a semiconductor processing facility, such as a semiconductor manufacturing facility, FAB and the like. Makeup water stream 16 may come from any suitable source, including a deionized water source, a reclaim water source from a processing facility, an external (municipal or other) water supply, etc. Stream 16 may also be filtered, softened to remove calcium and various other polyvalent cations, and exposed to UV light to eliminate potentially destructive components that may affect the operation of the system. Typically the exhaust streams are near ambient temperature systems and streams, although this is not essential to all embodiments of the invention.

From streams 14 and 16, system 10 produces a system product stream 18 and a system waste stream 20 therefrom. The system product (exhaust) stream has a concentration of NOx that is less than a determined threshold value, and the waste liquid stream contains the NOx that was removed from the feed stream. For example, the threshold value may correspond to selected or required emission limits. Typically, the value will be sufficiently less than a regulated limit to provide a selected margin for variance without exceeding the limit.

Figure 2:
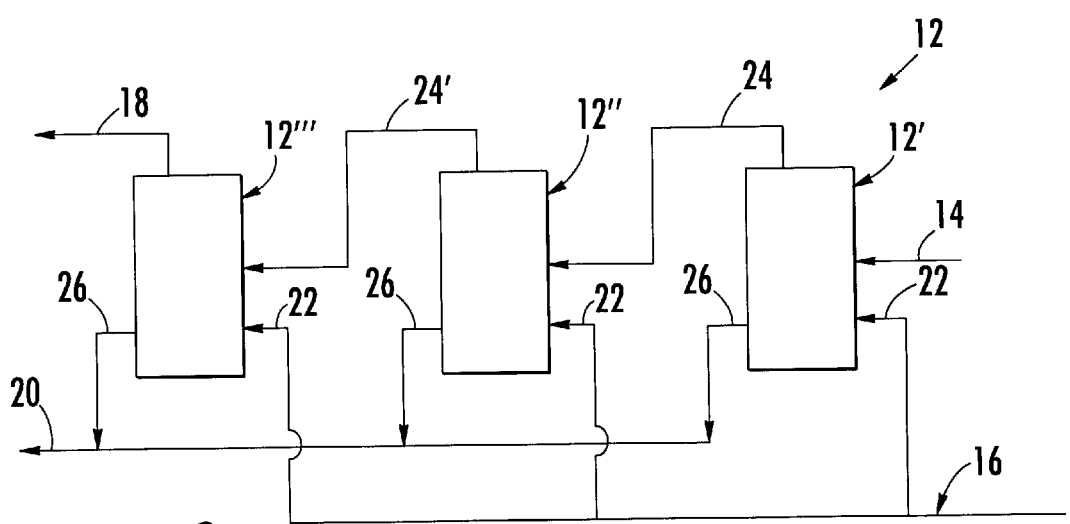
FIG. 2 is a schematic view of the plurality of scrubbing assemblies of FIG. 1.

In FIG. 2, the plurality of scrubbing assemblies of FIG. 1 are shown in more detail. For purposes of illustration, three sequential scrubbing assemblies 12', 12" and 12'" are shown, each of which receives a water stream 22 from makeup water stream 16. As shown, assemblies 12 are sequential scrubbing assemblies, in that the product stream from a first scrubbing assembly 12' becomes the feed stream for the next scrubbing assembly 12", the product stream from that scrubbing assembly becomes the feed stream for the next scrubbing assembly 12'", and so on.

For example, scrubbing assembly 12' receives process exhaust stream 14 and a water stream 22 and produces an intermediate product exhaust stream 24 and a waste stream 26. As a result of the treatment provided in scrubbing assembly 12', intermediate product exhaust stream 24 contains a concentration of NOx that is less than the concentration of NOx in process exhaust stream 14, and waste liquid stream 26 contains the removed NOx. A second scrubbing assembly 12" receives as its feed stream intermediate product exhaust stream 24 and a water stream 22 and produces another intermediate product exhaust stream 24' and another waste stream 26 therefrom. Similar to the result of treatment in the first scrubbing assembly, the concentration of NOx in intermediate product exhaust stream 24' is less than the concentration of NOx in the corresponding intermediate product exhaust stream from the first scrubbing assembly. The intermediate product exhaust stream from assembly 12" becomes the feed for a third scrubbing assembly 12'", which in FIG. 3 produces system product exhaust stream 18 and another waste liquid stream 26. For purposes of illustration, the waste streams from the individual scrubbing assemblies are shown collectively forming system waste stream 20. It should be understood that in practice waste liquid streams 26 may not be physically joined into a combined stream, although they may all be transported to the same destination.

Because the concentration of NOx in the product stream for a particular assembly will be lower than the concentration of NOx in the corresponding feed stream for that assembly, having a series of scrubbing assemblies enables system 10 to produce a system product stream 18 with a concentration of NOx that is much lower than could be produced by a single scrubbing assembly functioning alone. Each assembly may remove, for example, approximately 40% to 60% or more of the remaining NOx in the corresponding feed stream. For the purpose of illustration, assume each scrubbing assembly removes 50% of the NOx from its feed stream. If system 10 includes two scrubbing assemblies, the system product stream will have a NOx concentration that is 25% of the NOx concentration in process stream 14. If a third scrubbing assembly is added, such as shown in FIG. 2, then the concentration of NOx in the product stream is further reduced to 12.5% of the concentration of NOx in process stream 14.

It should be understood that the number of scrubbing assemblies in a particular embodiment of system 10 may vary, depending upon such factors as the desired concentration of NOx in the system product stream and the initial concentration of NOx in the process stream. Typically, system 10 will include two or more scrubbing assemblies. For example, if system 10 is used to treat a process stream containing a concentration of 400 ppm NOx, it will take more scrubbing assemblies to produce a product stream with a NOx concentration of less than 50 ppm than if the process stream began with only a NOx concentration of 100 ppm. Another factor to consider is the equipment cost and space requirements. Understandably, the concentration of NOx in system product stream 18 could be reduced to only a few percent or less of the concentration of NOx in process stream 14, however, the expense of having a sufficient number of scrubbing assemblies to achieve this goal would be prohibitive in most applications. In general, the number of scrubbing assemblies will be selected based upon the expected concentration of NOx in process stream 14, the desired concentration of NOx in system product stream 18, (often times including a selected margin for variance), and the materials and operating expenses associated with each additional scrubbing assembly.

Figure 3:
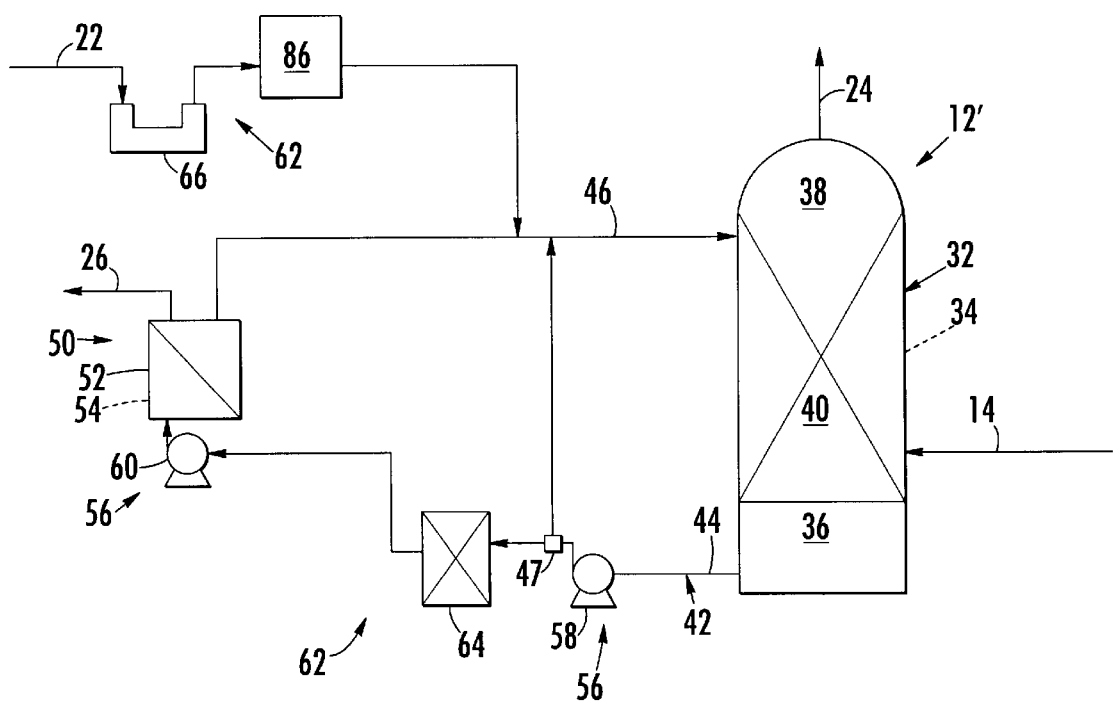
FIG. 3 is a schematic view of one of the plurality of scrubbing assemblies of FIG. 1.

An example of one of the plurality of scrubbing assemblies 12 is shown in more detail in FIG. 3. The other scrubbing assemblies have similar elements and subelements, unless otherwise specified. As shown, assembly 12' includes a scrubber unit 32 that is adapted to receive and contact a feed stream, such as process stream 14, and a water stream 22 to produce intermediate product stream 24 with a concentration of NOx that is less than the concentration of NOx in the feed stream. Scrubber 32 may utilize any suitable form of packing or tray design 34, as will be selected depending upon such factors as the composition of process stream 14, the diameter of scrubber 32 and the expected throughput through scrubber 32. For the flowrates and operating conditions discussed herein, a packed vertical tower has proven effective. Although the configuration of the scrubber illustrated in FIG. 3 shows a countercurrent flow between the recycled water stream and the NOx-containing effluent exhaust gas stream, it should be understood that any suitable flow pattern may be used, including crosscurrent, concurrent and misting.

As shown, scrubber 32 includes a sump, or basin, portion 36 in which liquid accumulates, a return portion 38 through which the intermediate or system product stream is exhausted and a central scrubbing region 40 through which the streams interact. Scrubber 32 further includes a recirculation, or recycle, loop 42 through which accumulated liquid is drawn from sump portion 36 and delivered to return portion 38. As shown, recycle loop 42 includes a recycle feed stream 44 leaving the sump portion, and a recycle product stream 46 returning to the return portion of the scrubber. The fluid recycled by recycle loop 42 passes downward through scrubbing region 40 as the feed stream rises through the region. The water and gaseous streams interact as they pass through the tower, with the goal of reducing the concentration of NOx in the intermediate product stream to below a selected minimum level.

Figure 4:
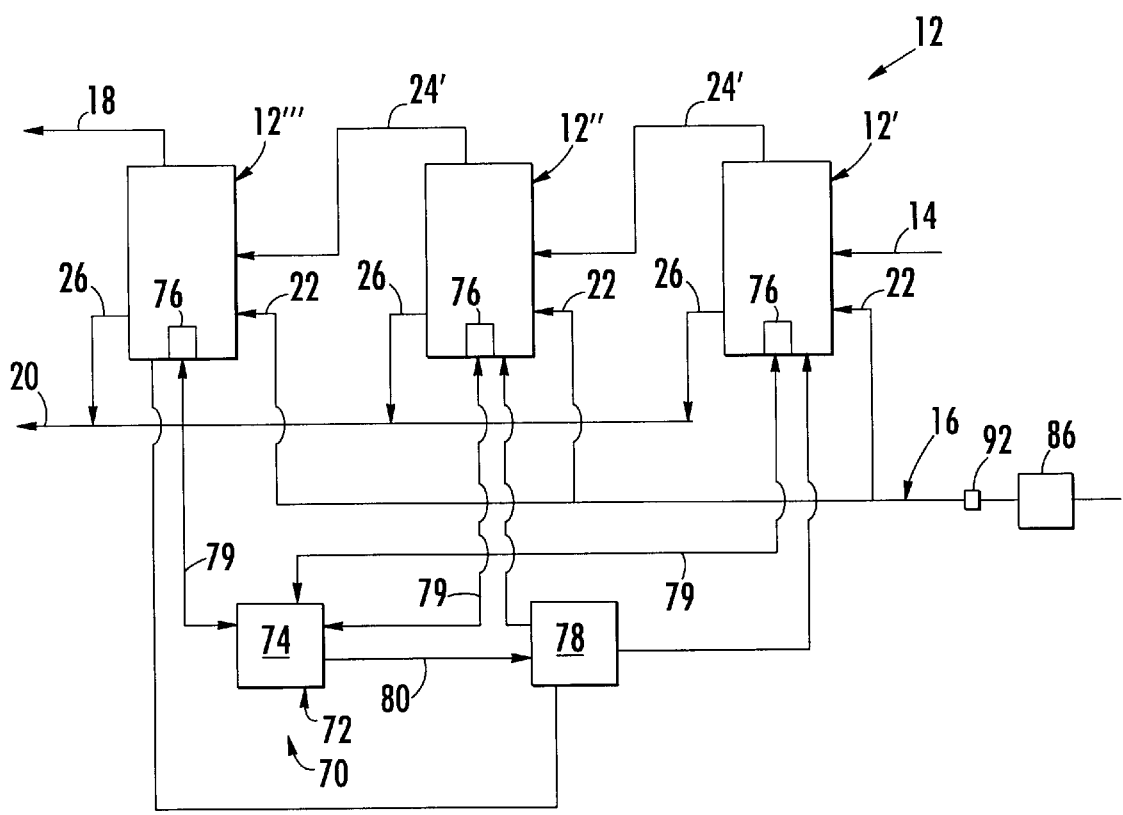
FIG. 4 is a schematic view of the NOx scrubbing system of FIG. 2 including a pH assembly adapted to maintain the system at a pH within one or more selected threshold values.

Typically, process stream 14 will be at least substantially a gas-phase stream, resulting in return portion 38 being a top portion of the scrubber and product streams 18 and 24, such as shown in FIGS. 2 and 4, being primarily gas streams.

However, other configurations and makeups are possible, for example, depending upon the scrubber configuration and the composition and phase of feed and product streams 14 and 24.

Unlike conventional NOx scrubbers, scrubber assembly 12' further includes a reverse osmosis (RO) assembly 50 that receives at least a portion of the recycle feed stream and reduces the concentration of NOx therein to produce a concentrated RO waste stream 26 and recycle product stream 46. For example, assembly 12' typically includes a valve assembly 47 that directs a selected portion of the main recirculation flow to be delivered the RO assembly. For example, approximately 10% of the flow in stream 44 may be diverted for delivery to the RO assembly, although it should be understood the portion of the recirculation stream delivered to RO assembly 50 may vary and may include portions that are larger or smaller than those discussed above.

Reverse osmosis assembly 50 includes at least one reverse osmosis unit 52, each of which houses a membrane 54 selected to remove or at least significantly reduce the concentration of NOx in the product, or permeate, stream from the RO unit. The recovery rate of the RO units may vary, depending upon desired performance and operating conditions. Typically, recovery rates in the range of approximately 50% to approximately 95% will be used, with more common recovery rates being in the range of approximately 60% to approximately 90%. As an illustrative example, the RO units may be operated at a 75% single-pass recovery rate, meaning that 75% of the flow will pass through the membrane to form a permeate stream with less than a determined concentration of NOx, with the remaining 25% forming a waste stream containing at least a significant portion of the NOx. It is projected that at least 40–60% of the NOx in the portion of the recycle stream being fed to the RO assembly may be removed with a loss of only approximately 5–10% of the overall flowrate in that stream.

Thin film composite (TFC) membranes have proven effective for this application. Suitable TFC membranes are available from Hydranautics, Inc. of Oceanside, California and typically take the form of elongate tubes. From RO assembly 50, the permeate stream forms recycle product stream 46, with the bulk of the NOx being contained in concentrated waste stream 26.

RO assembly 50 will typically include a pump assembly 56 that is adapted to transport the recycle stream to the RO units and to ensure that there is sufficient downstream pressure at the output of the assembly. In FIG. 3, pump assembly 56 is illustrated to include a transfer pump 58 that draws the recycle feed stream from sump portion 36 of the scrubber and transports the stream toward RO assembly 50. Also shown is one or more high-pressure, or booster, pumps 60 that ensure that the recycle feed stream is at a sufficient upstream pressure before entering the RO assembly to account for the pressure drop as the stream passes through one or more RO units. It should be understood that the pressure required may vary depending upon such factors as the flowrate of fluid in the recycle stream, the pressure drop within the individual RO units, the number of RO units connected in series, the efficiency of the RO units, the flux rate of the RO membranes, the ionic concentration of the RO feed stream, any contamination, damage or other fouling of the RO membranes, etc.

System 10 may include a pretreatment assembly adapted to remove selected components from the streams that may impair the effectiveness or operation of the system. Examples of such a pretreatment assembly are shown in FIG. 3 and generally indicated at 62. As shown, one assembly 62 is located upstream from RO assembly 50. Assembly 62 includes a filter 64 that removes particles from recycle feed stream 44 that are larger than a selected size. A 20-micron filter is projected to be effective to remove larger particulate, however filters of other sizes or even no filter may be used. Similarly, a filter assembly including a plurality of filters with the same or differing sizes may be used. Also shown in FIG. 3 is another pretreatment assembly 66 adapted to pretreat water stream 22. As shown, the assembly includes a UV lamp 66 and an ion-removal assembly 86. The UV lamp kills biological components in the stream. Suitable UV lamps are produced by Aquionics, Inc. of Cincinnati, Ohio. Ion-removal assembly 86 is used to remove undesirable ions, such as polyvalent cations from the water stream, as discussed in more detail below. It should be understood that system 10 may be implemented without either of the pretreatment assemblies discussed above and that the assemblies may each include any of the components described herein in various quantities alone or in combination with other suitable pretreatment components.

In FIG. 3, RO assembly 50 is schematically illustrated with a single RO unit 52; however, the number of RO units 52 in a particular system may vary. It is within the scope of the invention that RO assembly 50 may include more than one RO unit, and more particularly, that it may include multiple RO units connected in parallel and/or series. The number and configuration of RO units will tend to vary from NOx system to NOx system, depending for example upon such factors as the flowrate through the system, the concentration of NOx in process stream 14 and in the recycle feed stream, the desired overall removal of NOx, etc. When implementing RO assembly 50 to a particular scrubbing system, there is a selective tradeoff between such factors as total NOx removal, water consumption, materials and equipment cost. Other suitable RO configurations, pretreatments and operating conditions are disclosed in U.S. Pat. No. 5,925,255, the disclosure of which is hereby incorporated by reference.

Regardless of the particular configuration of RO unit or units, the above discussion demonstrates that the addition of RO assembly 50 to scrubbing assembly 12 results in a substantial reduction in water demand, as well as a similar reduction in flowrate in waste stream 26. For example, a NOx scrubbing system without a RO assembly may use approximately 10,000 gpd of once-through scrubbing water. On the other hand, adding RO assembly 50 to the same scrubbing system reduces the makeup water consumption by at least 60%, and more often approximately 80% or more. This reduction in water demand correlates to a substantial savings in daily operating expense because of decreased makeup water supply and disposal expenses, in addition to the less tangible water conservation benefits.

For example, a conventional NOx treatment system may require at least 10,000 gpd of makeup water, in addition to the bulk materials required for NOx removal. If peroxide is used to effect NOx removal, the system may require approximately 250 gpd of hydrogen peroxide, in addition to the overhead for storage and delivery of the peroxide. This conventional system may remove approximately 80% of the NOx from the process exhaust stream. By comparison, system 10 requires only a fraction of the makeup water, typically only approximately 20% of the makeup water required for a conventional once-through system. System 10 is projected to remove approximately 88% of the NOx (for the three-stage system described above) and eliminates the cost for hydrogen peroxide and the materials and equipment costs associated with hydrogen peroxide, thereby resulting in significant savings over the peroxide scrubbing system described above.

System 10 preferably is operated at a high pH to improve the scrubbing efficiency of the acid fumes, such as a pH in the range of approximately 9 to approximately 12. Another advantage of maintaining the system at an elevated pH is that it at least substantially eliminates the biofouling of the RO membranes without requiring the added expense of a biofoulant scale inhibitor and corresponding storage and delivery systems. A pH of approximately 10.5 has proven effective. It should be understood that the RO membranes and other components of system 10 should be selected to be compatible with the selected pH, and vice versa.

Biofouling refers to the biological growth, such as bacteria, viruses, spores, and endotoxins that may occur on the RO membranes. This growth occludes or otherwise fouls the membranes and prevents fluid from passing therethrough. Cleaning a fouled RO membrane not only is a cost- and labor-intensive procedure, but also requires the membrane to be removed from service until cleaned. This is especially significant considering the frequency at which cleaning is required without a suitable mechanism for preventing biofouling. Known methods for controlling biofouling in other applications are not applicable for use in NOx scrubbing system 10 because they are either cost prohibitive, tend to vaporize away in the scrubber, or will damage the TFC membranes used in the RO units. Also, many of the known procedures for removing biofouling from TFC membranes produce waste streams that also must be treated before disposal.

The high pH from the addition of caustic, or another suitable base prevents biofouling of the R.O. membranes. It also improves the system's ability to scrub NOx from the process exhaust gas streams. The chemistry involved in scrubbing the NOx from the process exhaust gas stream and discharging in a liquid waste stream is believed to involve the following reactions with caustic (NaOH), oxygen ($O_2$), and water ($H_2O$).

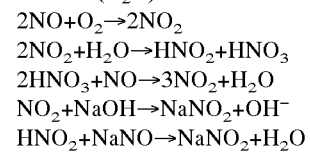

The scrubbing process and associated chemical reactions may occur over a wide range of temperatures, such as temperatures in the range of approximately 15°0 C. to approximately 75° C., and preferably at ambient temperature of approximately 20° C. to 25° C.

An example of a pH assembly is schematically illustrated in FIG. 4 and generally indicated at 70. Assembly 70 includes a control system 72 with a controller 74 that communicates with one or more pH sensors, or probes, 76 that are adapted to measure the pH of the fluid in system 10.

Preferably, each of the plurality of scrubbing assemblies includes at least one sensor 76 to enable pH assembly 70 to selectively monitor and control the pH in each scrubbing assembly. Responsive to inputs from the sensors, such is via communication links 79, controller 74 regulates the pH of system 10 to prevent the pH from exceeding at least one determined threshold value. For example, controller 74 may be adapted to maintain the pH of the system between selected upper and lower threshold values. Alternatively, only an upper or lower threshold value may be used.

For example, because fresh makeup water is being continuously or periodically added to the system, while fluid from the system is continuously or periodically being drawn away, the overall pH of the system will tend to decline over time. Moreover, the NOx removed from the process exhaust stream in each stage of the scrubbing system lowers the pH in both an acid-base reaction with the acid (low pH) exhaust fumes and directly in the NOx reactions in the liquid stream, thereby requiring additional caustic to be added to maintain the pH of the system within determined threshold values. To prevent the pH from dropping below a selected minimum value, controller 74 causes the pH to be raised, such as by adding a suitable base, or base chemical, to the fluid in the system. An example of a suitable base is sodium hydroxide, or caustic, which not only performs well in the NOx scrubber operating environment but also is cost effective and easy to handle. In most processing facilities, the cost and materials savings over a peroxide system are even more pronounced because the facility will typically already use caustic for other applications and therefore will already have caustic storage and delivery systems.

As shown in FIG. 4, controller 74 communicates with a base delivery system 78 that is adapted to deliver a selected base to one or more of the scrubbing assemblies responsive to control signals from controller 74, such as through communication link 80. The communication links between controller 74 and the base delivery system, sensors and the subsequently discussed ion-removal assembly may be any suitable wired, mechanical or wireless mechanism for at least one-way communication between controller 74 and the selected component of system 10. Preferably, the interaction between pH assembly 70 and scrubbing assemblies 12 is automated, so that manual monitoring and control of the system is not required. Automation of control system 72 enables the NOx treatment system to respond automatically to variations in the pH of the scrubber liquor solution. Increased NOx in the process exhaust stream causes a drop in pH and caustic feed is increased, regardless if this variation is expected or even detected prior to delivery to system 10.

Figure 5:
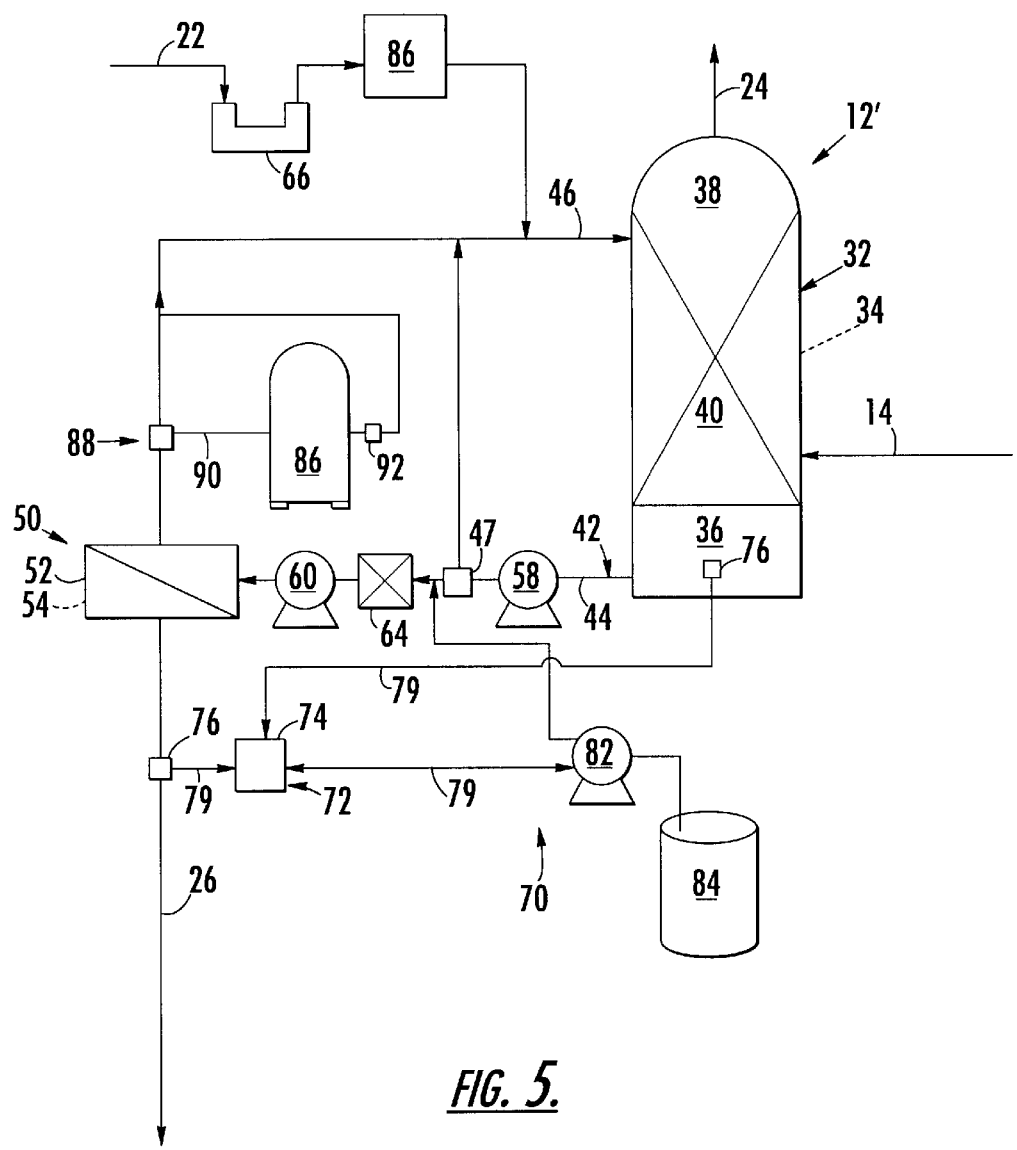
FIG. 5 is a schematic view showing the scrubbing assembly of FIG. 3 and a portion of the pH assembly of FIG. 4.

In FIG. 5, the interactions between pH assembly 70 and an exemplary one of the plurality of scrubbing assemblies 12 is shown for purpose of illustration. It should be understood, that a single controller 74 may monitor and control the pH in the entire NOx treatment, or the control system may include a plurality of subsystems or controllers adapted to regulate the pH in a particular scrubbing assembly. As shown, scrubbing assembly 12' includes two pH sensors 76, one to measure the pH in the sump portion 36 of scrubber 32 and another to measure the pH of waste stream 26 from the RO assembly. It should be understood that more or less pH sensors may be used, including monitoring at locations other than those illustrated in FIG. 5. Responsive to the measured pH value, the controller maintains the pH between selected upper and lower limits through any suitable mechanism, such as a PID loop.

In FIG. 5, base delivery system 78 is shown to include a pump assembly 82 adapted to draw a selected base from a supply, or reservoir, 84 responsive to control signals from controller 74. As shown, the base is added to recycle feed stream 46, however, it is within the scope of the invention that the added base may be introduced to the system in additional or other locations. Each of the plurality of scrubbing assemblies may include its own pump assembly 82 and reservoir 84, however, system 10 will typically include a centralized reservoir 84 from which one or more pumps and related valves and transport lines draw the selected quantity of base to be added to a particular scrubbing assembly.

It should be understood that controlling the pH for a plurality of scrubbing assemblies is more difficult than controlling the pH for a single assembly because of the downstream effect of adding base to a particular scrubbing assembly. For example, adding a quantity of base to scrubbing assembly 12', such as may be required from time to time to maintain the pH of the assembly within selected threshold values, will also raise the pH of the streams exiting therefrom. Specifically, intermediate product stream 24 will tend to have a higher pH because of the added base. Therefore, control system 72 preferably is either a centralized system for all scrubbing assemblies, or includes system-specific subsystems that communicate with each other.

Because it may be desirable to selectively lower the pH in system 10, pH assembly 70 preferably also includes a mechanism for selectively reducing the pH in the system, and especially in a selected one or more of the scrubbing assemblies. In FIG. 5, pH assembly 70 is shown further including an ion-removal assembly 86 downstream from RO assembly 50. For example, a sodium zeolite or WAC resin system may be used. Sodium zeolite and WAC resin bottles, for example, are relatively inexpensive and may be regenerated after use, either on site or by service water companies, such as US Filter.

As shown, a valve assembly 88 selectively diverts a portion of recycle product stream 46 to form side stream 90, which is passed through ion-removal assembly 86. An example of a suitable ion-removal assembly is a portable WAC resin bottle. The pH in the portion of stream 46 passing through assembly 86 is lowered by the removal of sodium ions causing the association of hydroxide ions with hydronium ions, to produce neutral water. This reduces the overall pH of the recycle stream when the side stream is recombined with the rest of the recycle product stream. The portion of the recycle stream diverted by valve assembly 88 may vary, between none of the stream and all of the stream, and preferably is regulated by control system 72, and more particularly by control signals from controller 74.

In addition to removing hydroxide ions from fluid passing through it, ion-removal assembly 86 may also be used to remove undesirable ions elsewhere in the system. For example, in FIG. 5, another ion-removal assembly 86 is shown adapted to treat water stream 22. Whether direct from an outside source or reclaimed from elsewhere within the FAB or other structure within which system 10 is used, water stream 16 may contain concentrations of calcium, magnesium and other polyvalent cations that will tend to precipitate out of solution and impair the operation of system 10. For example, the precipitated mineral salts will tend to foul RO membranes 54 and the packing or trays in scrubbers 32. A manual or computerized hardness monitor 92, or other suitable sensor, may be used downstream of any of the ion-removal assemblies 86 as a safeguard, or indicator, of when the assemblies need to be cleaned or otherwise regenerated. Monitors 92 may communicate with controller 74, such as to provide feedback regarding the composition of the makeup stream downstream from assemblies 86.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of Applicants' invention.

Industrial Applicability

The present invention is applicable to any facility in which effluent gas or other process exhaust streams containing NOx need to be treated to reduce the concentration of NOx therein. For example, the invention is applicable to treat low temperature streams containing NOx generated by chemical etching processes that incorporate nitric acid as a chemical constituent in the etch.

We claim:

1. A method for treating a process stream containing a concentration of NOx, the method comprising:
   providing a NOx treatment system containing a plurality of sequential scrubbing assemblies;
   receiving a process exhaust feed stream containing NOx and a water stream into the system; and
   contacting the feed and water streams in the plurality of scrubbing assemblies to produce a product stream containing less than a determined threshold concentration of NOx, and at least one waste stream containing the removed NOx, wherein each scrubbing assembly includes at least one scrubber unit and a reverse osmosis assembly including at least one reverse osmosis unit.

2. The method of claim 1, wherein the waste stream contains at least 70% of the NOx in the feed stream.

3. The method of claim 2, wherein the method further includes measuring the pH of fluid in the system and adjusting the pH of the system to maintain the pH within selected threshold values.

4. The method of claim 3, wherein the method further includes measuring the pH of each of the plurality of scrubbing assemblies.

5. The method of claim 4, wherein the method further includes adjusting the pH of at least one of the scrubbing assemblies responsive to the measured pH.

6. The method of claim 1, wherein the plurality of scrubbing assemblies includes at least two scrubbing assemblies connected in series.

7. The method of claim 1, wherein the flowrate of the waste stream is less than approximately 20% of the flowrate of the water stream.

8. The method of claim 1, wherein the method further includes measuring the pH of the system and actuating a pH assembly to raise the pH of the system if the measured pH is lower than a determined threshold value.

9. The method of claim 1, wherein the method further includes measuring the pH of the system and actuating a pH assembly to lower the pH of the system if the measured pH is higher than a determined threshold value.

10. The method of claim 1, wherein the method further includes measuring the pH of each of the plurality of scrubbing assemblies and selectively adjusting the pH therein if the measured pH exceeds a determined threshold value.

11. A NOx scrubbing system, comprising:
   a plurality of sequential scrubbing assemblies, each including a scrubber unit constructed and arranged to receive and contact a feed stream containing a concentration of NOx and a water stream to produce a product stream with a concentration of NOx that is lower than the concentration of NOx in the feed stream,
      wherein each scrubber assembly further includes a pump assembly constructed and arranged to draw a recycle feed stream having a concentration of NOx from a sump portion of the corresponding scrubber unit and to return a recycle product stream to a return portion of the corresponding scrubber unit,
      wherein each scrubber assembly further includes a reverse osmosis assembly including at least one reverse osmosis unit constructed and arranged to receive the recycle feed stream and remove a portion of the NOx therefrom to produce the recycle product stream with a concentration of NOx that is less than the concentration of NOx in the recycle stream and a waste stream containing the removed NOx,
      wherein the feed stream for a first of the scrubbing assemblies is a process stream containing a concentration of NOx, and the feed stream for each subsequent scrubbing assembly in the plurality of scrubbing assemblies includes the product stream from the preceding scrubbing assembly; and
   a pH assembly constructed and arranged to maintain the pH of the system within determined threshold values.

12. The system of claim 11, wherein the plurality of scrubbing assemblies includes at least two sequential scrubber assemblies.

13. The system of claim 11, wherein the pH assembly is constructed and arranged to maintain the pH of the system in the range of approximately 8 to approximately 14.

14. The system of claim 13, wherein the pH assembly is constructed and arranged to maintain the pH of the system in the range of approximately 9 to approximately 11.

15. The system of claim 11, wherein the pH assembly includes an automated control system constructed and arranged to maintain the pH of the system within selected threshold values.

16. The system of claim 15, wherein the control system includes a controller and at least one sensor constructed and arranged to measure the pH of the system, wherein the controller is constructed and arranged to adjust the pH of the system responsive to inputs from the at least one sensor.

17. The system of claim 16, wherein the controller is constructed and arranged to automatically adjust the pH of the system responsive to inputs from the at least one sensor.

18. The system of claim 17, wherein the pH assembly includes a supply of a base and a delivery system constructed and arranged to selectively add base to the system responsive to control signals from the controller.

19. The system of claim 17, wherein the pH assembly is constructed and arranged to lower the pH of the system responsive to control signals from the controller.

20. The system of claim 19, wherein the pH assembly includes a removal assembly constructed and arranged to divert at least a portion of the recirculation product stream of at least one of the plurality of scrubbing assemblies and reduce the pH therein responsive to control signals from the controller.

21. The system of claim 11, wherein the pH assembly includes a plurality of sensors, each constructed and arranged to measure the pH of a respective one of the scrubbing assemblies.

22. The system of claim 11, wherein each of the reverse osmosis assemblies is constructed and arranged to minimize the flowrate of the waste stream produced therein to less than approximately 25% of the flowrate of the feed stream received by that reverse osmosis assembly.

23. The system of claim 22, wherein each of the reverse osmosis assemblies is constructed and arranged to minimize the flowrate of the waste stream produced therein to less than approximately 10% of the flowrate of the feed stream received by that reverse osmosis assembly.

24. The system of claim 11, wherein the waste stream from the reverse osmosis assemblies of the plurality of scrubbing assemblies contains at least 50% of the NOx in the recirculation product streams.

25. The system of claim 11, wherein the process stream includes an effluent exhaust stream from a semiconductor processing facility.

26. A NOx treatment system comprising:

a plurality of sequential scrubbing assemblies, each constructed and arranged to receive and contact a feed stream containing a concentration of NOx and a water stream to produce a product stream with a concentration of NOx that is lower than the concentration of NOx in the feed stream, and a waste stream containing the removed NOx;

means for maintaining the pH of the system within selected threshold values; and means for reducing the concentration of NOx in the product stream to below a determined threshold value, wherein the means for reducing include at least one reverse osmosis unit associated with each of the plurality of scrubbing assemblies.

27. The system of claim 26, wherein the means for reducing are constructed and arranged to remove at least 70% of the NOx from the feed stream.

28. The system of claim 27, wherein the means for reducing are constructed and arranged to remove at least 85% of the NOx from the feed stream.

29. The system of claim 26, wherein the means for reducing are constructed and arranged to produce a waste stream with a flowrate that is less than approximately 25% of the flowrate of the water stream.

30. The system of claim 29, wherein the means for reducing are constructed and arranged to produce a waste stream with a flowrate that is less than approximately 10% of the flowrate of the water stream.

31. The system of claim 26, wherein the means for maintaining are constructed and arranged to maintain the system at a pH between approximately 9 and approximately 12.

32. The system of claim 26, wherein the means for maintaining include at least one sensor constructed and arranged to measure the pH at one or more selected locations in the system and a controller in communication with at least one sensor and constructed and arranged to selectively adjust the pH of the system responsive to inputs from the at least one sensor.

33. The system of claim 32, wherein the means for maintaining include at least one sensor constructed and arranged to measure the pH in each of the plurality of scrubbing assemblies.

* * * * *